United States Patent
Henry (10) Patent No.: US 11,420,399 B2
(45) Date of Patent: Aug. 23, 2022

(54) METHOD FOR MEASURING OVERLAPS IN PREPREG MATERIALS

(71) Applicant: The Boeing Company, Chicago, IL (US)

(72) Inventor: Jack William Henry, Saint Charles, MO (US)

(73) Assignee: THE BOEING COMPANY, Chicago, IL (US)

( * ) Notice: Subject to any disclaimer, the term of this patent is extended or adjusted under 35 U.S.C. 154(b) by 349 days.

(21) Appl. No.: 16/733,446

(22) Filed: Jan. 3, 2020

(65) Prior Publication Data

US 2021/0206118 A1 Jul. 8, 2021

(51) Int. Cl.
| | | |
|---|---|---|
| *B29C 65/00* | (2006.01) | |
| *B23K 9/02* | (2006.01) | |
| *G01B 11/02* | (2006.01) | |
| *B29C 65/78* | (2006.01) | |
| *B23K 101/18* | (2006.01) | |

(52) U.S. Cl.
CPC ............ *B29C 66/1122* (2013.01); *B23K 9/02* (2013.01); *B29C 65/7832* (2013.01); *B29C 66/435* (2013.01); *B29C 66/92211* (2013.01); *G01B 11/028* (2013.01); *B23K 2101/18* (2018.08)

(58) Field of Classification Search
CPC . B29C 65/7832; B29C 66/1122; B29C 66/43; B29C 66/43129; B29C 66/435; B29C 66/81463; B29C 66/836; B29C 66/8362; B29C 66/65; B29C 66/853; B29C 66/92; B29C 66/922; B29C 66/92211; B29C 66/961; B29C 66/9241; B29C 70/50; B65H 21/00; B65H 2301/46; B65H 2301/4602; B65H 2301/4621; B65H 2301/460186; C08J 5/24; G01B 11/028; B32B 41/00; B32B 2041/04
USPC ....... 156/64, 157, 308.4, 363, 378, 379, 502
See application file for complete search history.

(56) References Cited

U.S. PATENT DOCUMENTS

| | | | |
|---|---|---|---|
| 10,076,883 B2 | 9/2018 | Prebil et al. | |
| 2005/0261666 A1* | 11/2005 | Larson | A61M 25/0014 264/410 |
| 2007/0107827 A1* | 5/2007 | Takahashi | B32B 41/00 156/64 |
| 2016/0325509 A1* | 11/2016 | Prebil | B29C 66/72141 |
| 2021/0339486 A1* | 11/2021 | Bayer | B29C 70/50 |

OTHER PUBLICATIONS

DF Robot, RP-C7.6-ST Thin Film Pressure Sensor, Retrieved from the internet: URL: https://www.dfrobot.com/product-1841.html [retrieved on Nov. 21, 2019]; pp. 1-3.

* cited by examiner

*Primary Examiner* — John L Goff, II
(74) *Attorney, Agent, or Firm* — Coats & Bennett, PLLC (57) ABSTRACT

An assembly to connect together first and second sheet members. The assembly includes a pressure device that applies pressure to the sheet members while the sheet members are in an overlapping arrangement and positioned on a support platform. A sensing system that includes one or more thin film pressure sensors detects the positions of the leading and trailing edges. A connection device connects the members together in an overlapping arrangement.

20 Claims, 7 Drawing Sheets

METHOD FOR MEASURING OVERLAPS IN PREPREG MATERIALS

TECHNOLOGICAL FIELD

The present disclosure relates generally to the field of prepreg materials and, more specifically, to the field of positioning sheet members of prepreg material in an overlapping arrangement for connecting the sheet members together.

BACKGROUND

Prepreg materials are composite materials in which a high-strength reinforcement fiber is pre-impregnated with a thermoset or a thermoplastic resin. Prepreg material can be used to manufacture a wide variety of goods within a wide variety of contexts. Examples include but are not limited to manufacturing aircraft bodies within the aviation industry and automobile bodies within the automotive industry.

Sheet members of prepreg material may be manufactured in various widths and lengths. The sheet members can be connected together to form larger sizes, such as elongated rolls. The rolls include different sections in which the fibers are oriented in a particular orientation. The fiber orientation can provide for the needed strength and stiffness properties. Examples include a 0° orientation in which a majority of the fibers are oriented parallel to the lengthwise direction of the roll. Other examples include a 45° orientation with the majority of the fibers being aligned at a 45° angle relative to the length of the roll, and a 90° orientation with the fibers oriented perpendicular to the length of the roll.

The different sections can be formed by individual sheet members that are attached together. The manufacturing process provides for moving the individual sheets into an overlapping arrangement and connecting the individual sheets together. There is a need to determine the overlap between the sheet members prior to connecting the sheet members together.

SUMMARY

One aspect is directed to an assembly to connect together a first sheet member and a second sheet member that are positioned along a support platform. The assembly comprises a pressure device to apply pressure to both a leading edge of the first sheet member and a trailing edge of the second sheet member. A first thin film pressure sensor is positioned on a first side of the support platform with the first thin film pressure sensor detects a position of the leading edge of the first sheet member. A second thin film pressure sensor is positioned on a second side of the support platform with the second thin film pressure sensor configured to detect a position of a trailing edge of the second sheet member. A controller comprises a processing circuit configured to determine an amount of overlap between the leading edge of the first sheet member and the trailing edge of the second sheet member based on signals received from the first and second thin film pressure sensors. A connection device connects the first and second sheet members in an overlapping arrangement.

In another aspect, the pressure device is a roller that rotates to move the first and second sheet members along the support platform.

In another aspect, the first thin film pressure sensor is positioned on a first side of the support platform and the second thin film pressure sensor is positioned on an opposing second side of the support platform.

In another aspect, one or more additional thin film pressure sensors are spaced apart across a width of the support platform from the first thin film pressure sensor with each of the additional thin film pressure sensors and the first thin film pressure sensor detect a different section of the leading edge of the first sheet member.

In another aspect, at least one roller is positioned along the support platform upstream from the first and second thin film pressure sensors and upstream from the pressure device with the at least one roller rotates to move the first and second sheet members along the support platform.

In another aspect, the controller is configured to detect a gap between the leading edge of the first sheet member and the trailing edge of the second sheet member.

In another aspect, the first and second thin film pressure sensors are configured to detect thermoplastic composites.

In another aspect, the controller is configured to move the first sheet member away from the second sheet member when the amount of overlap exceeds a predetermined amount.

In another aspect, the connection device comprises at least one welding shoe that locally heats the first and second sheet members and forms a weld seam that connects the first and second sheet members in the overlapping arrangement.

One aspect is directed to an assembly to connect together a first sheet member and a second sheet member. The assembly comprises a support platform that contacts against and supports the first sheet member and the second sheet member. One or more rollers are positioned along the support platform to apply pressure to and to move the first sheet member and the second sheet member along the support platform. A thin film pressure sensor is positioned along the support platform with the thin film pressure sensor detects a position of a leading edge of the first sheet member and a trailing edge of the second sheet member. A controller comprises a processing circuit configured to determine an overlap between the first sheet member and the second sheet member based on signals received from the thin film pressure sensor. A connection device connects the first and second sheet members in an overlapping arrangement.

In another aspect, a first one of the rollers is positioned along the support platform at the thin film pressure sensor to force the first and second sheet members against the support platform.

In another aspect, the thin film pressure sensor is a first thin film pressure sensor and further comprising a second thin film pressure sensor located on an opposing side of the support platform from the first thin film pressure sensor to detect at least one of the leading edge of the first sheet member and the trailing edge of the second sheet member.

In another aspect, the controller is configured to receive signals from the first thin film pressure sensor to determine a position of the leading edge of the first sheet member and to receive signals from the second thin film pressure sensor to determine a position of the trailing edge of the second sheet member.

In another aspect, one or more thin film pressure sensors are positioned on a same side of the support platform from the thin film pressure sensor and spaced away from the thin film pressure sensor and each of the thin film pressure sensor and the thin film pressure sensor detect a different section of at least one of the first sheet member and the second sheet member.

In another aspect, the thin film pressure sensor extends laterally across an entirety of the support platform.

In another aspect, one of the rollers is vertically adjustable relative to the support platform between a first position that is in proximity to the support platform and a second position that is distanced away from the support platform.

One aspect is directed to a method of connecting together first and second sheet members. The method comprises: positioning the first sheet member along a support platform with a leading edge in proximity to a thin film pressure sensor; positioning the second sheet member along the support platform downstream from the first sheet member and with a trailing edge overlapping the leading edge of the first sheet member; applying pressure to the leading edge and the trailing edge; while applying the pressure, determining based on signals from the thin film pressure sensor that the leading edge of the first sheet member and the trailing edge of the second sheet member are in an overlapping arrangement; and connecting together the first and second sheet members in the overlapping arrangement.

In another aspect, determining that the leading edge of the first sheet member and the trailing edge of the second sheet member are in the overlapping arrangement comprises sensing the leading edge of the first sheet member with the thin film pressure sensor locating on a first side of the support platform and sensing the trailing edge of the second sheet member with a second thin film pressure sensor located on an opposing second side of the support platform.

In another aspect, the method further comprises moving a contact member away from the support platform prior to connecting together the first and second sheet members.

In another aspect, the method further comprises: sensing that an amount of overlap between the first and second sheet members is outside of a predetermined range; moving one or both of the first sheet member and the second sheet member along the support platform; thereafter, determining that the amount of overlap is within the predetermined range; and connecting together the first and second sheet members.

In another aspect, the method further comprises forming the connected first and second sheet members into a roll that is positioned downstream from a connecting device.

The features, functions and advantages that have been discussed can be achieved independently in various aspects or may be combined in yet other aspects, further details of which can be seen with reference to the following description and the drawings.

DETAILED DESCRIPTION

Figure 1:
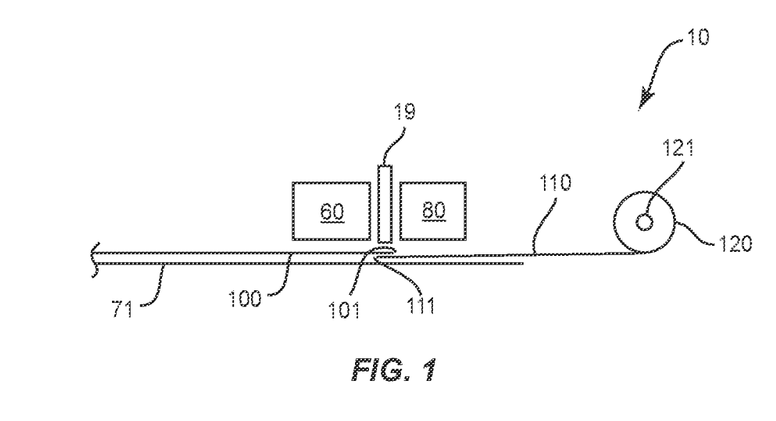
FIG. 1 is a schematic side view of an assembly for connecting together first and second sheet members in an overlapping arrangement.

FIG. 1 illustrates a block diagram of an assembly 10 for connecting together two sheet members of prepreg material. A pressure system 60 applies pressure to the sheet members 100, 110 that are positioned on a support platform 71 in an overlapping arrangement. A leading edge 101 of sheet member 100 overlaps with a trailing edge 111 of sheet member 110. A sensing system 19 detects the positions of the leading and trailing edges 101, 111. A connection system 80 connects the sheet members 100, 110 together in an overlapping arrangement.

The sheet members 100 can include various sizes. In one example, sheet member 110 is a roll 120 that is formed by multiple sheet members 100 that are connected together in an end-to-end configuration. Initially, the roll 120 consists of a single sheet member 100. A leading edge 101 of each additional sheet member 100 is connected to the trailing edge 111 of the roll 120 to increase the length. The roll 120 can include various lengths and be formed from various numbers of sheet members 100 that are connected together. The roll 120 can be formed around a core 121 that supports the sheet members 100. The core 121 can further be contacted by a roll device (not illustrated) to rotate and wind additional sheet members 100 onto the roll 120.

In another example, the sheet members 100, 110 have a shorter length and are roughly the same size. The smaller size allows for the sheet members 100, 110 to be supported on the support platform 71 without the need to form a roll.

FIG. 1 includes the leading edge 101 of sheet member 100 positioned over the trailing edge 111 of sheet member 110. Other examples can include the leading edge 101 positioned under the trailing edge 111.

Figure 2:
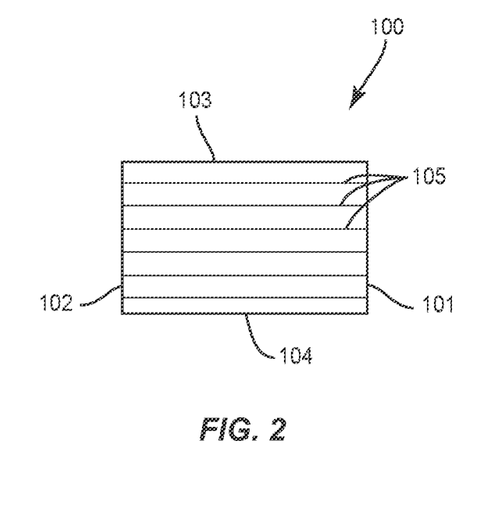
FIG. 2 is a schematic plan view of a sheet member that includes fibers.

FIG. 2 illustrates a sheet member 100 of prepreg material. The sheet member 100 includes a leading edge 101, trailing edge 102, and lateral edges 103, 104. The sheet member 100 can include a variety of different shapes and sizes, including a substantially rectangular shape as illustrated in FIG. 2. The sheet member 100 includes one or more layers of unidirectional fibers 105 that are pre-impregnated with a thermoset or thermoplastic matrix resin (e.g., prepreg). In the example of FIG. 2, a majority of the fibers 105 are oriented parallel to the lengthwise direction measured between the leading and trailing edges 101, 102 (i.e., a 0° sheet). The fibers 105 can be aligned at different orientations within the sheet. Another example includes a 90° sheet with the fibers 105 being substantially perpendicular to the lengthwise direction. In sheet members 100 with multiple layers of fibers 105, the fibers 105 of each layer can be aligned in the same or different orientations. The sheet member 100 can include a variety of thicknesses. Examples include but are not limited to thicknesses of between about 0.0025-0.0175 inches.

The fibers 105 can be formed from a variety of materials, including but not limited to aramids, polyolefins, metal, glass, carbon, boron, ceramic, mineral, and combinations. The fibers 105 are pre-impregnated with a thermoset or thermoplastic matrix resin (e.g., prepreg). In another example, the matrix resin includes a hybrid system of both thermoset and thermoplastic. The matrix resin can be formed from a variety of substances, including but not limited to acrylics, fluorocarbons, polyamides (PA), polyethylenes (PE) such as polyethylene terephthalate (PET), polyesters, polypropylenes (PP), polycarbonates (PC), polyurethanes (PU), polyetheretherketones (PEEK), polyetherketoneketones (PEKK), polyetherimides (PEI), and other material compositions.

Figure 3:
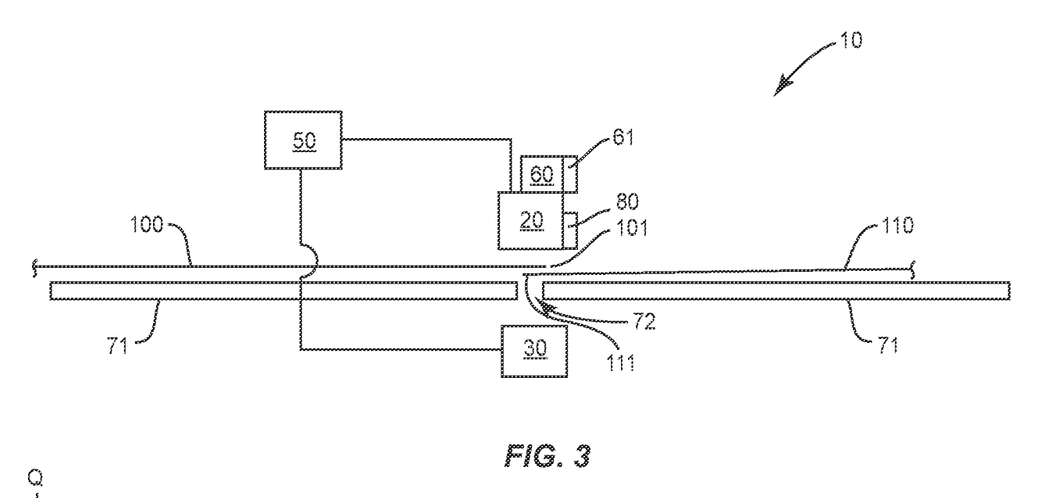
FIG. 3 is a schematic side view of an assembly for connecting together first and second sheet members in an overlapping arrangement.
Figure 4:
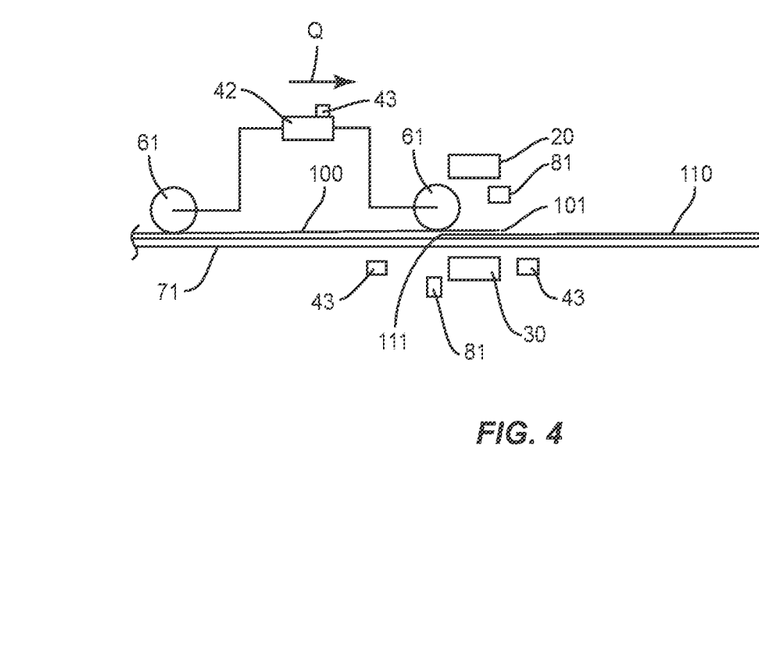
FIG. 4 is a schematic side view of an assembly for connecting together first and second sheet members in an overlapping arrangement.
Figure 5:
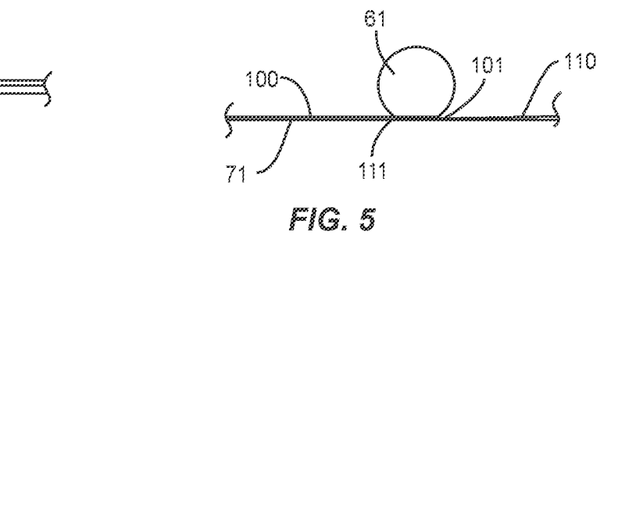
FIG. 5 is a side schematic view of a contact member that applies pressure to first and second sheet members.

FIG. 3 illustrates an assembly 10 to connect together first and second sheet members 100, 110. The sheet members 100, 110 are positioned along a support platform 71 with the leading edge 101 of the sheet member 100 overlapping with a trailing edge 111 of sheet member 110. The support platform 71 provides a rigid base against which the pressure system 60 applies a force to compress together the two sheet members 100, 110. The pressure system 60 includes one or more contact members 61 that contact the top-most sheet member 100, 110. In one example as illustrated in FIG. 4, the contact members 61 include one or more rollers 61 that rotate to drive the sheets members 100, 110 along the support platform 71. The rollers 61 can be biased towards the support platform 71 to apply a force on the sheet members 100, 110. In another example as illustrated in FIG. 5, the one or more rollers 61 are constructed from a flexible material. During rotation, the portion of the roller 61 that contacts the sheet member 100 is deformed while applying the force against the sheet member 100.

Figure 6A:
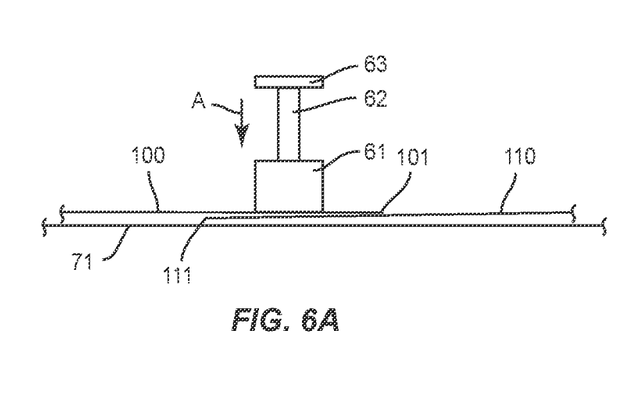
FIG. 6A is a side schematic view of a contact member in a first position that applies pressure to first and second sheet members.
Figure 6B:
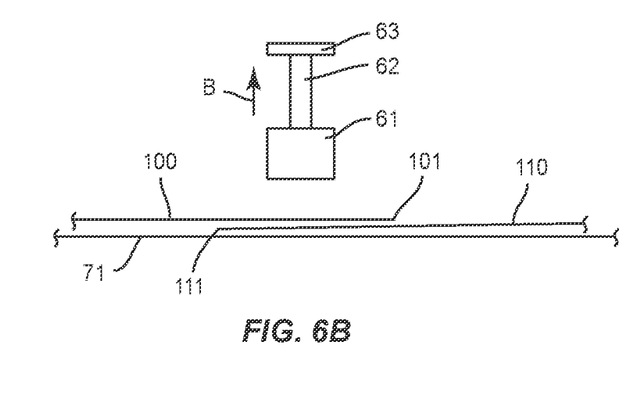
FIG. 6B is a side schematic view with the contact member of FIG. 6A in a second position away from the first and second sheet members.

In another example as illustrated in FIG. 6A, the contact member 61 is connected to a motor 63 via an arm 62. The motor 63 brings the contact member 61 downward in the direction of arrow A into contact with the sheet member 100 to apply a force downward towards the rigid support platform 73. The contact member 61 remains in the downward position while the amount of overlap is determined between the sheet members 100, 110. As illustrated in FIG. 6B, the motor 63 moves the contact member 61 in the direction of arrow B away from the support platform 71 after the overlap is sensed. FIGS. 6A and 6B include an example with a single contact member 61 being raised and lowered. In other examples, two or more contact members 61 are raised and lowered to apply and remove the pressure. In one example, the contact member 61 is moved away from the sheet members 100, 110 prior to the connection system 80 connecting the sheet members 100, 110 together. Another example includes the contact member remaining in contact during the connection.

Figure 7:
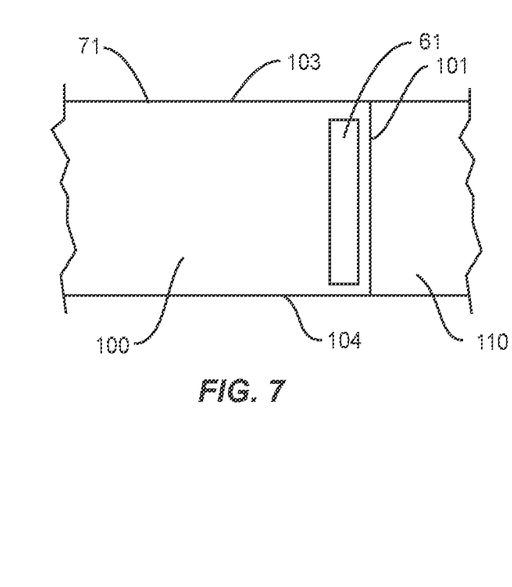
FIG. 7 is a schematic plan view of a contact member that extends across first and second sheet members and a support platform.

In the various examples, the contact member 61 can include various sizes and configurations. As illustrated in FIG. 7, the contact member 61 extends across the lateral width of the support platform 71. This can include extending between the lateral edges 103, 104 of the sheet member 100. In a similar example, the contact member 61 is larger than the sheet member 100 and extends outward beyond the support platform 71 and beyond both lateral edges 103, 104 of the sheet member. Other examples include two or more contact members 61 positioned across the support platform 71.

Figure 8:
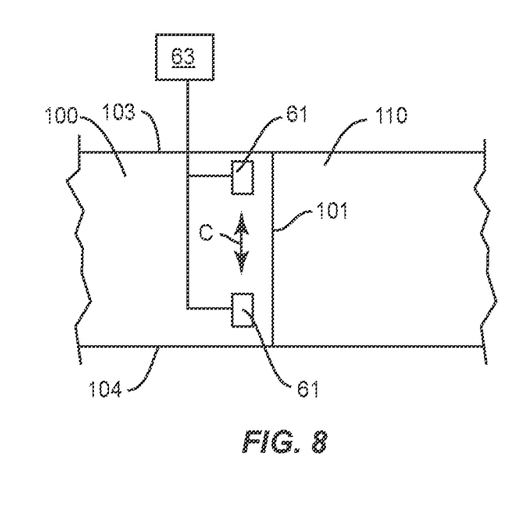
FIG. 8 is a schematic plan view of first and second contact members that are movable across the first and second sheet members and a support platform.

The contact members 61 can be movable across the width the of the support platform 71. In one example as illustrated in FIG. 8, the contact members 61 are movable across the entire or portions of the width of the support platform 71 as illustrated by arrow C. In another example, one or more contact members 61 move within a limited area of the sheet member 100.

The sensing system 19 detects the positions of the leading edge 101 of sheet member 100 and trailing edge 111 of sheet member 110. In one example as illustrated in FIG. 3, a first thin film pressure sensor 20 is positioned on a first side of the sheet members 100, 110. The first thin film pressure sensor 20 detects a position of the leading edge 101 of the sheet member 100. A second thin film pressure sensor 30 is positioned on an opposing second side of the sheet members 100, 110 to detect the trailing edge 111 of sheet member 110.

The thin film pressure sensors 20, 30 include one or more layers of conductive material and one or more layers of pressure sensitive layers. When pressure is applied to the sheet members 100, 110 through the one or more contact members 61, the pressure sensitive layers and conductive layers are connected to convert the pressure into electrical conductance. The electrical conductance is proportional to the pressure. Pressure variations from the discontinuity of material provide for the thin film pressure sensors 20, 30 to detect the leading edge 101 and the trailing edge 111.

Figure 9:
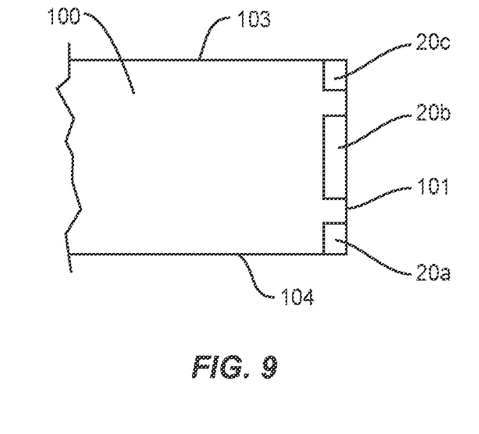
FIG. 9 is a schematic plan view of multiple thin film pressure sensors that detect different sections of a leading edge of a sheet member.

The number and positioning of the thin film pressure sensors 20, 30 can vary. FIG. 9 illustrates an example of three thin film pressure sensors 20a, 20b, 20c positioned across the width of the sheet member 100 to detect the leading edge 101. The first thin film pressure sensor 20a is positioned in a first corner of the sheet member 100 at the intersection of the leading edge 101 and lateral edge 104. The second thin film pressure sensor 20b is positioned at a central area of the leading edge 101. The third thin film pressure sensor 20c is positioned at the intersection of the lateral edge 103 and the leading edge 101. In another example, a single thin film pressure sensor 20 detects the leading edge 101. In a specific example, the single thin film pressure sensor 20 is positioned at the intersection of the leading edge 101 and one of the lateral edges 103, 104.

The second thin film pressure sensor 30 detects a position of the trailing edge 111 of the sheet member 110. The number and positioning of the second thin film pressure sensors 30 is the same as described above for the first thin film pressure sensor 20. In one example as illustrated in FIG. 3, the second thin film pressure sensor 30 is positioned at a gap 72 in the support platform 71. In another example, the second thin film pressure sensor 30 is able to detect the trailing edge 111 through the support platform 71.

Figure 10:
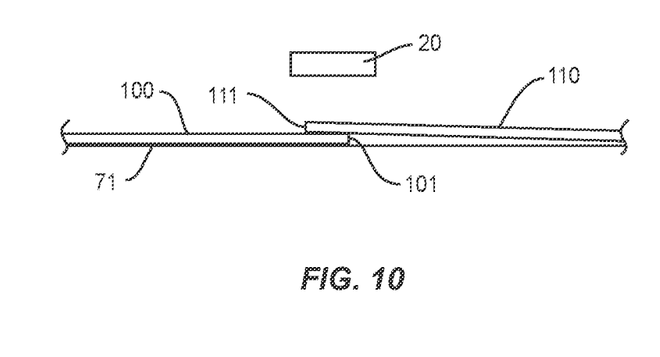
FIG. 10 is a schematic side view of a thin film pressure sensor that detects a leading edge of a first sheet member and a trailing edge of a second sheet member.

FIG. 10 includes another example with a single thin film pressure sensor 20 that detects both the leading edge 101 of sheet member 100 and trailing edge 111 of sheet member 110. The single thin film pressure sensor 20 can be positioned on either side of the support platform 71.

In the various examples, the first thin film pressure sensor 20 is positioned on one side of the support platform 71 can detect one or both of the leading edge 101 and the trailing edge 111. Likewise, the second thin film pressure sensor 20 positioned on the opposing second side of the support platform 71 can detect one or both of the leading edge 101 and the trailing edge 111.

The sheet members 100, 110 can be moved to the sensing system 19 in various manners. One example as illustrated in FIG. 4 includes one or more rollers 61 that are positioned along the support platform 71. The rollers 61 contact against and rotate to move the sheet member 100 along the support platform 71 in the direction indicated by arrow Q. The rollers 61 can rotate at various speeds to control the movement of the sheet member 100 while moving along the support platform 71. In one example, the rollers 61 include a circular sectional shape to facilitate the contact with the sheets 100 during rotation and maintain contact at the various rotational positions. In other examples, the rollers 61 include non-circular sectional shapes. One or more motors 42 provide for rotation of the rollers 61. The motors 42 can be unidirectional to drive the rollers 61 in a single direction, or can be multidirectional to drive the rollers 61 in both forward and rearward directions.

One or more sensors 43 measure the position of the sheet members 100, 110 along the support platform 71. The sensors 43 can detect the position in various manners. In one example, the sensors 43 are optical sensors positioned along the support platform 71 to detect the sheet members 100, 110 when passing the sensor location. In another example, the sensors 43 are optical encoders that sense the amount of rotation of the motors 42. Sensors 43 can also include one or more laser micrometers or optical sensors configured for measuring the gap or distance between the trailing and leading edges of adjacent sheet members 100, 110. Other sensors 43 include but are not limited to still cameras and/or video cameras, and fiber optic sensors. Signals from the sensors 43 are received by a controller 50 to calculate the position of the sheet members 100, 110.

In another example, the sheet members 100, 110 are moved by robotic devices. The robotic devices include gripping fingers that grasp and place the sheet members 100, 110 onto the support platform 71. The robotic devices can further adjust the relative positioning between the sheet members 100, 110 to adjust the amount of overlap.

The connection system 80 connects the sheet members 100, 110 together. The connection system 80 forms a weld seam 113 (see FIGS. 13 and 14) to join the sheet members 100, 110. The connection system 80 includes one or more welding shoes 81 configured to apply heat along the edges 101, 111. The welding shoes 81 are heated and placed in contact with the sheet member 100, 110 for a predetermined period of time. The matrix material of the sheet members 100, 110 temporarily melts or reduces in viscosity at the location of the welding shoes 81. The melted or reduced-viscosity matrix material at least partially intermingles such that when the welding shoes 81 are removed, the matrix material cools and re-solidifies to form the weld seam 113 that permanently binds the sheet members 100, 110.

Figure 11:
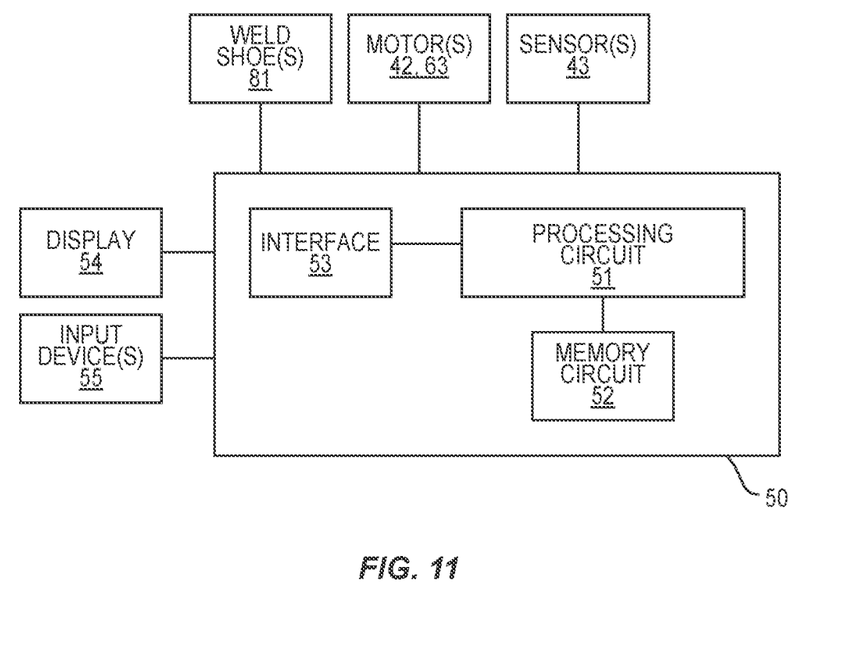
FIG. 11 is a schematic diagram of a controller.

A controller 50 receives signals from the first and second thin film pressure sensors 20, 30 and determines an amount of overlap. The controller 50 can also control the positioning of the sheet members 100, 110 along the support platform 71. As illustrated in FIG. 11, the controller 50 includes a processing circuit 51 and a memory circuit 52. The processing circuit 51 controls the operation of the assembly 10 according to program instructions stored in the memory circuit 52. Within examples, the processing circuit 51 includes one or more circuits, microcontrollers, microprocessors, hardware, or a combination thereof. Memory circuit 52 includes a non-transitory computer readable storage medium storing program instructions, such as a computer program product, that configures the processing circuit 51 to implement one or more of the techniques discussed herein. Memory circuit 52 can include various memory devices such as, for example, read-only memory, and flash memory.

In one example, memory circuit 52 is a separate component as illustrated in FIG. 11. In another example, memory circuit 52 is incorporated with the processing circuit 51.

An interface 53 provides for a user to control one or more aspects of the assembly 10. This can include one or more displays 54 for displaying information to the user and/or one or more input devices 55 such as but not limited to a keypad, touchpad, roller ball, and joystick. The interface 53 provides for the user to enter commands to the processing circuit 51. The commands can provide for a variety of functions, including but not limited to moving one or both of the sheet members 100, 110 along the support platform 71, and activating the connection system 80 to connect the sheet members 100, 110 together. In another example, the controller 50 is configured to automatically operate the assembly 10 without the need for input from a user.

The controller 50 is configured to send and/or receive signals to the motors 42, 63 sensors 43, thin film pressure sensors 20, 30 welding shoes 81, robotic devices, etc. to control the positioning and connection of the sheet members 100, 110. FIG. 11 includes the controller 50 overseeing and controlling the various components of the assembly 10. In another example, one or more sub-controllers perform specific operations within the assembly process. For example, a pressure sub-controller can control the positioning of the one or more contact members 61 against the sheet members 100, 110. The sub-controller can signal the status of the controller 50 that oversees the entire assembly process.

Figure 12:
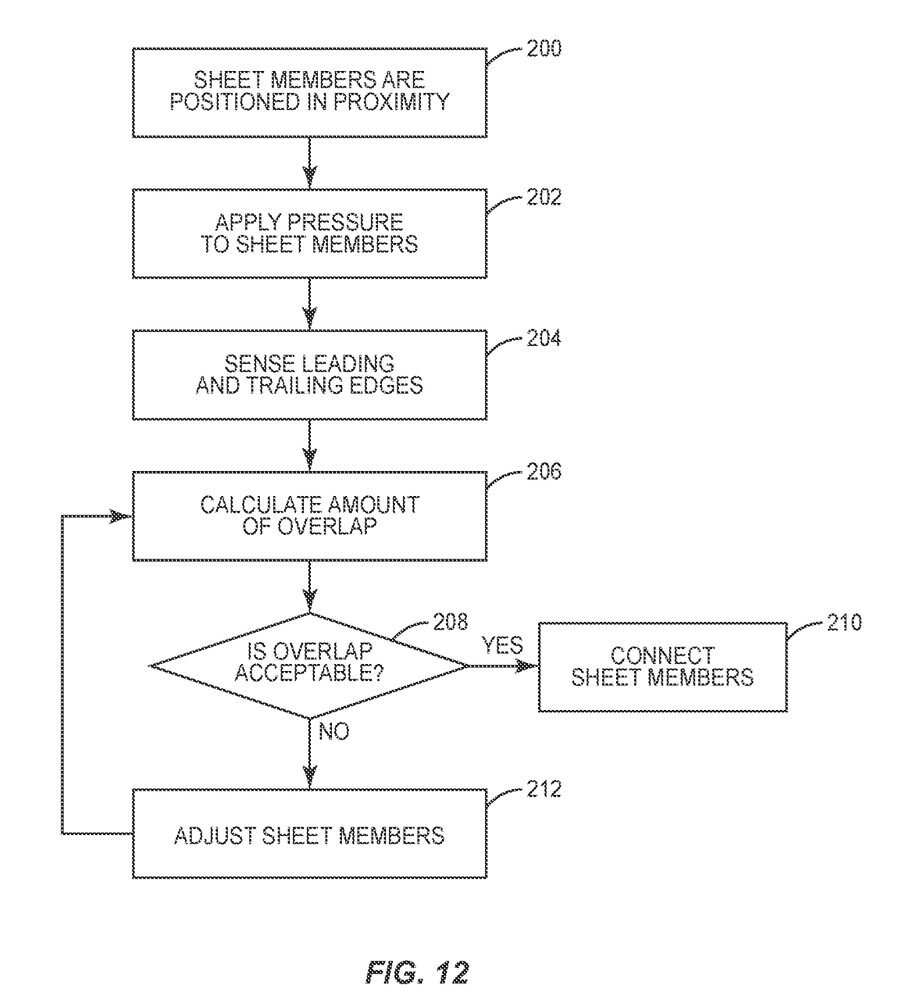
FIG. 12 is a flowchart diagram of a method of connecting together first and second sheet members in an overlapping arrangement.

FIG. 12 illustrates a method of connecting together sheet members 100, 110. The method includes positioning the sheet members 100, 110 in proximity (block 200). This can include activating one or more rollers 61 and moving the one or more sheet members 100, 110 along a support platform 71. This can also include controlling a robotic device and positioning the sheet members 100, 110 relative to each other on the support platform 71.

Pressure is applied to the sheet members 100, 110 (block 202). This can include applying a force through one or more contact members 61. The one or more thin film pressure sensors 20, 30 senses the location of the leading edge 101 of sheet member 100 and the trailing edge 111 of sheet member 110 (block 204). This can include one or more thin film pressure sensors 20, 30 on one or both sides of the sheet members 100, 110. In one example, each thin film pressure sensor 20, 30 detects both the leading edge 101 and the trailing edge 111 and signals the controller 50. The controller 50 then determines the relative positioning of the edges 101, 111 based on the signals from the one or more thin film pressure sensors 20, 30 (block 206). This can include determining a position of leading edges 101, 111 relative to a reference point or plane and/or relative to each other. The controller 50 is then able to calculate the distance between the edges 101, 111 and thus the overlap or lack of overlap.

The controller 50 determines whether the amount of overlap is acceptable (block 208). The acceptable amount of overlap can be a specific amount or a range. In one example, an acceptable range is an overlap up to about 0.2 inches. If the amount of overlap is acceptable, the sheet members 100, 110 are connected together (block 210). This can include moving the one or more welding shoes 81 into contact with one or both of the sheet members 100, 110. During the connection, the controller 50 monitors and/or regulates one or more welding parameters such as but not limited to, the pressure, temperature, speed, and/or dwell time of one or more of the welding shoes 81. The connection system 80 can include one or more temperature sensors 43 to monitor the temperature of the welding shoes 81 and/or monitor the temperature of one or both of the sheet members 100, 110 at the location of the abutting end edges 101, 111. Once complete, a weld seam 113 is formed that connects together the sheet members 100, 110.

If the overlap is not acceptable, one or both of the sheet members 100, 110 are adjusted (block 212). In one example, the amount of overlap is too great and one or both sheet members 100, 110 are moved to reduce the amount. In one specific example, the sheet member 100 is moved away from the sheet member 110 when the overlap is too great. In another example, the sheet members 100, 110 are spaced apart by a gap. One or both sheet members 100, 110 are moved to provide for an acceptable amount of overlap. In another example, the sheet members 100, 110 are skewed relative to one another such that an amount of overlap along one lateral edge 103 of the sheet member 100 is different than the overlap along the other lateral edge 104. This can include a skew of greater than a predetermined amount between the lateral edges 103, 104. In another example, the amount of overlap at one of the lateral edges 103, 104 is too small or too great. One or both sheet members 100, 110 are moved to address the skew. After adjustment, the amount of overlap is again calculated until an acceptable amount is calculated and the sheet members 100, 110 are connected together.

Figure 13:
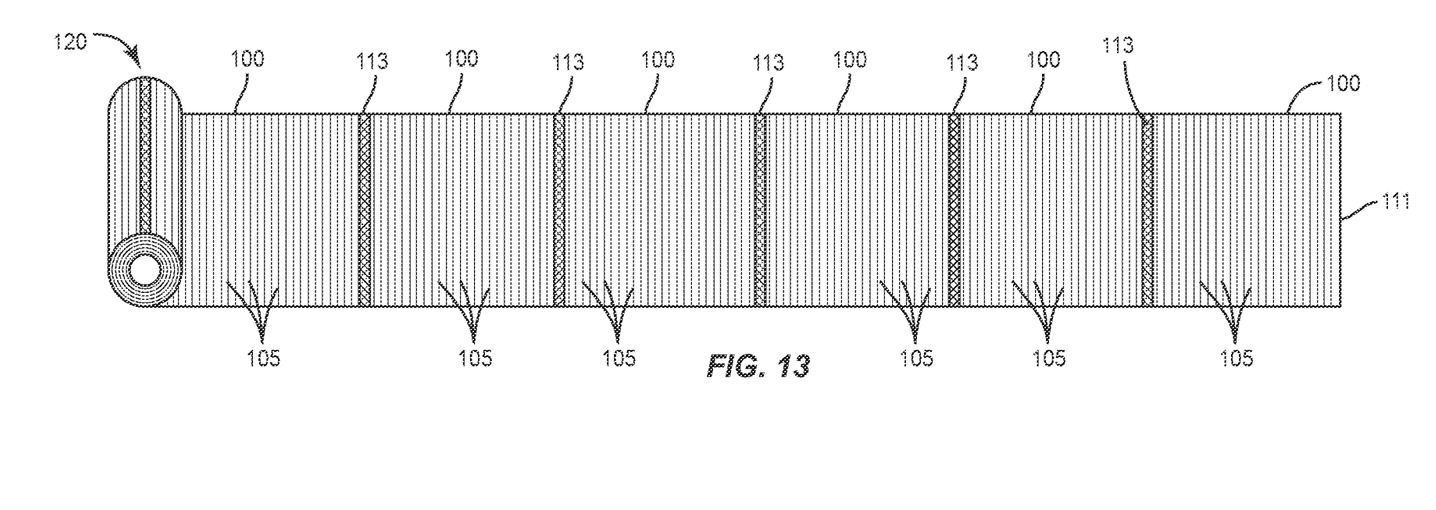
FIG. 13 is a schematic view of a roll of sheet members that are connected together at weld seams.
Figure 14:
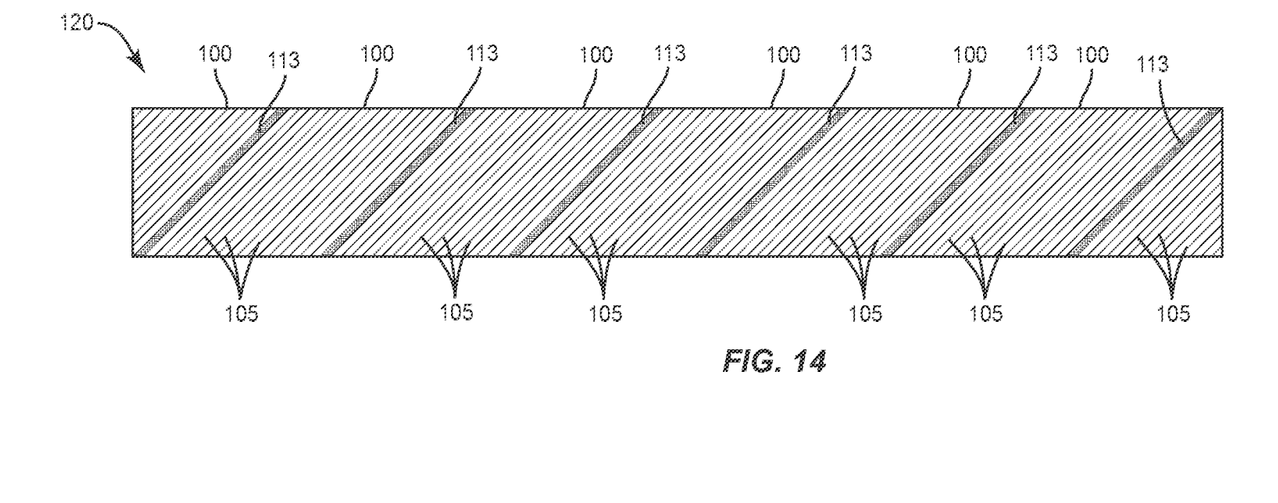
FIG. 14 is a schematic view of a roll of sheet members that are connected together at weld seams.

The sheet members 100, 110 can be connected together in a variety of orientations. FIG. 13 includes a roll 120 of sheet members 100 that are connected together at weld seams 113. The roll 120 is a 90° roll 120 with a majority of the fibers 105 of the sheets 100 being substantially perpendicular to the lengthwise direction of the roll 120. FIG. 14 illustrates a roll 120 with a majority of the fibers 105 aligned at a 45° angle relative to the lengthwise direction of the roll 120. The seams 113 connecting the adjacent sheets 100 are also aligned at a 45°. Rolls 120 can also be formed with the fibers 105 at various other angles, such as but not limited to 15°, 22.5°, 30°, and 60°.

The connected sheet members 100, 110 can be used in a wide variety of contexts. One context includes the construction of various components and bodies for vehicles. One example of a vehicle is a commercial aircraft used for transporting passengers and/or cargo. One example of a vehicle structure is a wing or wing component of an aircraft. Other vehicles include but are not limited to unmanned aircraft, manned spacecraft, unmanned spacecraft, manned rotorcraft, unmanned rotorcraft, satellites, rockets, missiles, manned terrestrial aircraft, unmanned terrestrial aircraft, manned surface water borne aircraft, unmanned surface water borne aircraft, manned sub-surface water borne aircraft, unmanned sub-surface water borne aircraft, and combinations thereof.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An assembly to connect together a first sheet member and a second sheet member that are positioned along a support platform, the assembly comprising:
    a pressure device to apply pressure to both a leading edge of the first sheet member and a trailing edge of the second sheet member;
    a first thin film pressure sensor positioned on a first side of the support platform, the first thin film pressure sensor configured to detect a position of the leading edge of the first sheet member;
    a second thin film pressure sensor positioned on a second side of the support platform, the second thin film pressure sensor configured to detect a position of a trailing edge of the second sheet member;
    a controller comprising a processing circuit configured to determine an amount of overlap between the leading edge of the first sheet member and the trailing edge of the second sheet member based on signals received from the first and second thin film pressure sensors; and
    a connection device that connects the first and second sheet members in an overlapping arrangement.

2. The assembly of claim 1, wherein the pressure device is a roller that rotates to move the first and second sheet members along the support platform.

3. The assembly of claim 1, wherein the first thin film pressure sensor is positioned on a first side of the support platform and the second thin film pressure sensor is positioned on an opposing second side of the support platform.

4. The assembly of claim 1, further comprising one or more additional thin film pressure sensors that are spaced apart across a width of the support platform from the first thin film pressure sensor, each of the additional thin film pressure sensors and the first thin film pressure sensor detect a different section of the leading edge of the first sheet member.

5. The assembly of claim 1, further comprising at least one roller positioned along the support platform upstream from the first and second thin film pressure sensors and upstream from the pressure device, the at least one roller rotates to move the first and second sheet members along the support platform.

6. The assembly of claim 1, wherein the controller is configured to detect a gap between the leading edge of the first sheet member and the trailing edge of the second sheet member.

7. The assembly of claim 1, wherein the controller is configured to move the first sheet member away from the second sheet member when the amount of overlap exceeds a predetermined amount.

8. The assembly of claim 7, wherein the connection device comprises at least one welding shoe that locally heats the first and second sheet members and forms a weld seam that connects the first and second sheet members in the overlapping arrangement.

9. An assembly to connect together a first sheet member and a second sheet member, the assembly comprising:
    a support platform that contacts against and supports the first sheet member and the second sheet member;
    one or more rollers positioned along the support platform to apply pressure to and to move the first sheet member and the second sheet member along the support platform;
    a thin film pressure sensor positioned along the support platform, the thin film pressure sensor detects a position of a leading edge of the first sheet member and a trailing edge of the second sheet member;

a controller comprising a processing circuit configured to determine an overlap between the first sheet member and the second sheet member based on signals received from the thin film pressure sensor; and a connection device that connects the first and second sheet members in an overlapping arrangement.

10. The assembly of claim 9, wherein a first one of the rollers is positioned along the support platform at the thin film pressure sensor to force the first and second sheet members against the support platform.

11. The assembly of claim 9, wherein the thin film pressure sensor is a first thin film pressure sensor, and further comprising a second thin film pressure sensor located on an opposing side of the support platform from the first thin film pressure sensor to detect at least one of the leading edge of the first sheet member and the trailing edge of the second sheet member.

12. The assembly of claim 11, wherein the controller is configured to receive signals from the first thin film pressure sensor to determine a position of the leading edge of the first sheet member and to receive signals from the second thin film pressure sensor to determine a position of the trailing edge of the second sheet member.

13. The assembly of claim 9, further comprising one or more thin film pressure sensors positioned on a same side of the support platform from the thin film pressure sensor and spaced away from the thin film pressure sensor, each of the one or more thin film pressure sensors and the thin film pressure sensor detect a different section of at least one of the first sheet member and the second sheet member.

14. The assembly of claim 9, wherein the thin film pressure sensor extends laterally across an entirety of the support platform.

15. The assembly of claim 9, wherein one of the rollers is vertically adjustable relative to the support platform between a first position that is in proximity to the support platform and a second position that is distanced away from the support platform.

16. An assembly for connecting together first and second sheet members, the assembly comprising:

a support platform for positioning the first sheet member with a leading edge in proximity to a thin film pressure sensor;

the support platform configured for positioning the second sheet member along the support platform downstream from the first sheet member and with a trailing edge overlapping the leading edge of the first sheet member;

a pressure device for applying pressure to the leading edge and the trailing edge;

a controller comprising a processing circuit configured to cause the pressure device to apply the pressure and to determine based on signals from the thin film pressure sensor that the leading edge of the first sheet member and the trailing edge of the second sheet member are in an overlapping arrangement; and a connecting device for connecting together the first and second sheet members in the overlapping arrangement.

17. The assembly of claim 16, wherein the controller is configured to determine that the leading edge of the first sheet member and the trailing edge of the second sheet member are in the overlapping arrangement based on the signals from the thin film pressure sensor regarding the leading edge of the first sheet member with the thin film pressure sensor located on a first side of the support platform and based on second signals from a second thin film pressure sensor regarding the trailing edge of the second sheet member with the second thin film pressure sensor located on an opposing second side of the support platform.

18. The assembly of claim 16, further comprising the controller configured for moving the pressure device away from the support platform prior to connecting together the first and second sheet members.

19. The assembly of claim 16, further comprising the controller configured for:

sensing that an amount of overlap between the first and second sheet members is outside of a predetermined range;

moving one or both of the first sheet member and the second sheet member along the support platform;

thereafter, determining that the amount of overlap is within the predetermined range; and connecting together the first and second sheet members.

20. The assembly of claim 16, further comprising a core for forming the connected first and second sheet members into a roll and with the core positioned downstream from the connecting device.

* * * * *